US012372215B1

(12) United States Patent
McCanless

(10) Patent No.: US 12,372,215 B1
(45) Date of Patent: Jul. 29, 2025

(54) MODULAR TRACK LIGHTING SYSTEM

(71) Applicant: ABL IP Holding LLC, Atlanta, GA (US)

(72) Inventor: Forrest Starnes McCanless, Decatur, GA (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 18/812,049

(22) Filed: Aug. 22, 2024

(51) Int. Cl.

| | |
|---|---|
| ***F21S 8/06*** | (2006.01) |
| ***F21V 21/008*** | (2006.01) |
| ***F21V 21/35*** | (2006.01) |
| ***H01R 25/14*** | (2006.01) |

(52) U.S. Cl.

CPC ............ *F21S 8/066* (2013.01); *F21V 21/008* (2013.01); *F21V 21/35* (2013.01); *H01R 25/14* (2013.01); *H01R 25/142* (2013.01); *H01R 25/145* (2013.01)

(58) Field of Classification Search

CPC ......... F21S 8/066; F21S 8/038; F21V 21/008; F21V 21/35; F21V 21/002; F21V 21/006; H01R 25/142; H01R 25/14; H01R 25/145

USPC .......................................................... 362/648

See application file for complete search history.

(56) References Cited

U.S. PATENT DOCUMENTS 8,939,634 B2 * 1/2015 Leadford .............. F21V 7/0091 362/225
2004/0160767 A1 * 8/2004 Mobarak ................. F21V 21/35 362/219
2014/0043802 A1 * 2/2014 Dings ................. F21V 23/0478 362/221
2014/0268718 A1 * 9/2014 Yu ......................... F21V 21/005 362/217.14
2017/0184290 A1 * 6/2017 Chiu ....................... F21V 21/35
2018/0313503 A1 * 11/2018 Sonneman .............. F21V 23/06

* cited by examiner

*Primary Examiner* — Laura K Tso

(74) *Attorney, Agent, or Firm* — Kilpatrick Townsend & Stockton LLP

(57) ABSTRACT

A modular track lighting system, such as but not limited to an overhead lighting system, includes one or more hubs and one or more tracks. Each of the one or more hubs includes at least one opening. At least one track may connect with the hub within the at least one opening to join the at least one track with the at least one hub.

20 Claims, 11 Drawing Sheets

MODULAR TRACK LIGHTING SYSTEM

FIELD OF INVENTION

The present technology relates to lighting systems and more particularly to lighting systems capable of being assembled in a plurality of arrangements and/or shapes as desired.

BRIEF SUMMARY OF THE INVENTION

Light fixtures may include one or more hubs and one or more tracks. Each of the one or more hubs includes one or more openings, and at least one track may connect within at least one opening to join the at least one track with the at least one hub. A plurality hubs and tracks may be assembled in a plurality of arrangements, patterns, and/or shapes as desired. The one or more hubs and the one or more tracks provide modular components customizable to provide a light fixture with a plurality of patterns as desired while simplifying field installation. In some embodiments, the light fixtures may be particularly useful as hanging or suspended light fixtures, although the embodiments described herein are not limited to such light fixtures.

DETAILED DESCRIPTION

Figure 1:
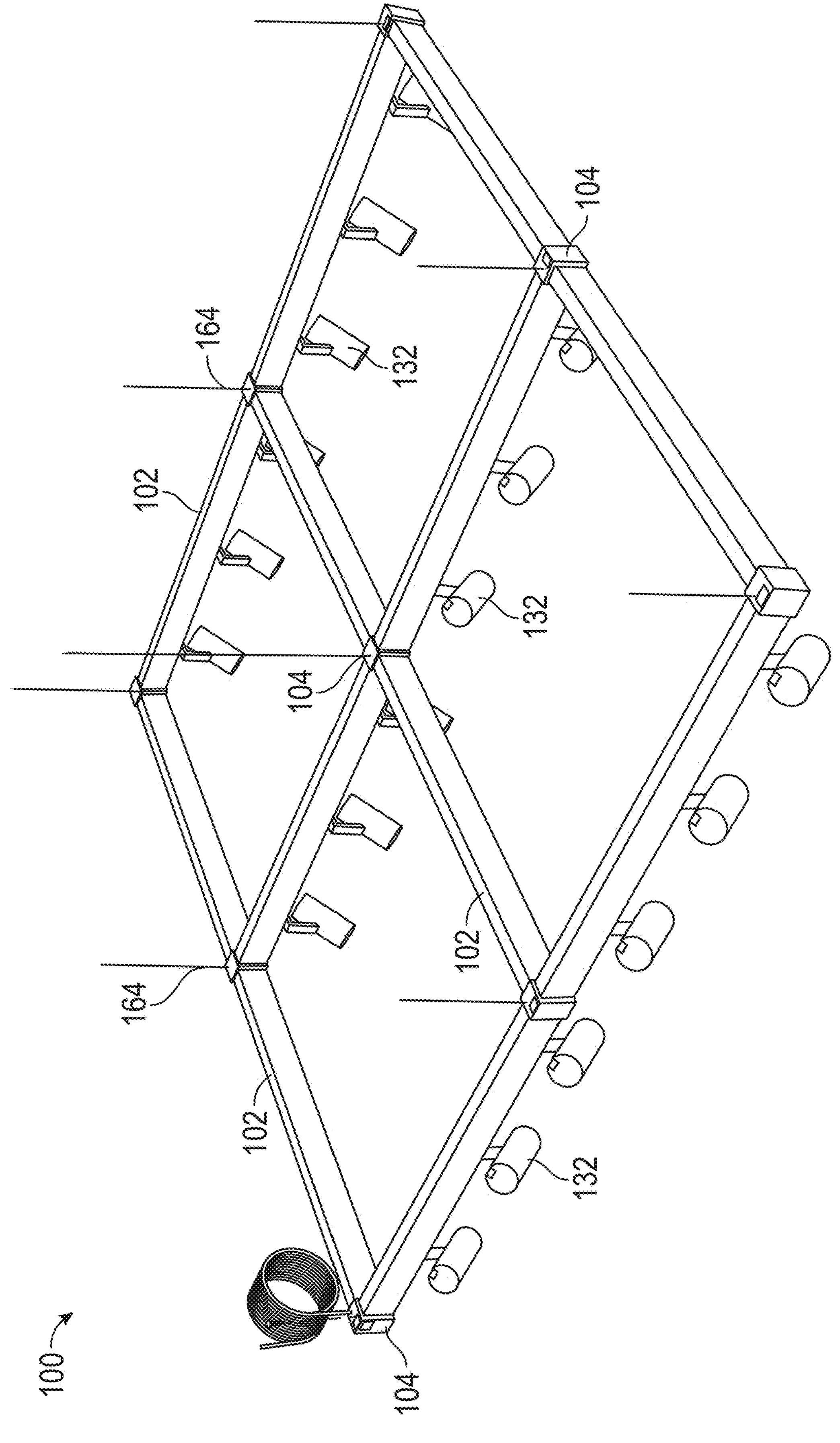
FIG. 1 is a top perspective view of a light fixture with one or more hubs and one or more tracks according to embodiments.

Described herein are light fixtures with elements or features allowing for simplified assembly and installation while also providing installation flexibility such that the light fixture may be assembled in a plurality of arrangements, patterns, and/or shapes as desired. In certain embodiments, the light fixtures described herein may include one or more hubs and one or more tracks. Each of the one or more hubs may include one or more openings, and at least one track may connect within at least one opening to join the at least one track with the at least one hub. The hubs may be various shapes or profiles as desired and includes at least two openings, such as at least three openings. In various embodiments the hub is a polygonal shape such as but not limited to a rectangle, triangle, pentagon, hexagon, etc. In embodiments with the plurality of openings, each opening may receive (and join) within the opening a corresponding rail (e.g., to extend a pattern of the light fixture in the direction of the opening) or a closing wall (e.g., to terminate the pattern of the light fixture in the direction of the opening).

In certain some embodiments, the connection between the track and the hub within the opening may be achieved without mechanical fasteners or hardware. In one non-limiting example, the track may positively latch to the hub. Some tracks may be powered and/or electrified, and one or more hubs optionally may function as a junction box for electrically connecting two tracks. In various embodiments, the powered tracks may support one or more light sources, such as but not limited to a downlight lighting source (e.g., a lamp) and/or an uplight lighting source. Optionally, at least one track need not be powered.

The light fixtures described herein may be assembled and/or supported in an environment using various techniques as desired. In one non-limiting example, the light fixture may be a suspended or hanging light fixture, and one or more hubs may include a support cable. Optionally, the support cable is centered on the hub.

The connection between a hub and a track may be referred to as a "joint," and the hub with the at least one opening may allow for a plurality of types of joint configurations to be formed using the same hub, partially dependent upon the polygonal shape of the hub, which in turn allows the light fixture to be assembled in a plurality of patterns. As a non-limiting example, the same rectangular hub may form a linear joint, and end cap, a joint with a "T" configuration, a joint with an "L" configuration, and/or a joint with an "X" configuration. As a further non-limiting example, the same triangular hub may form a joint with a "V" configuration, an end cap, and/or a joint with a "Y" configuration. Other configurations of joints may be utilized as desired, and the aforementioned examples should not be considered limiting. Various other benefits and advantages may be realized with the systems and methods provided herein, and the aforementioned advantages should not be considered limiting.

FIGS. 1-16 illustrate an example of a light fixture 100 formed using one or more tracks 102 and one or more hubs 104 according to embodiments. The light fixture 100 may be used in various environments or settings as desired. As one non-limiting example, the light fixture 100 may be a hanging or suspended light fixture 100 utilizing one or more support cables 164 as described in detail below. The number of tracks 102 and hubs 104 included with the light fixture 100 should not be considered limiting, and a light fixture 100 may include any number of tracks 102 and/or hubs 104 as desired to form a desired shape, arrangement, and/or pattern. Relatedly, the particular shape of the light fixture 100 formed by the one or more tracks 102 and one or more hubs 104 should not be considered limiting, and as discussed in detail below, the one or more tracks 102 and one or more hubs 104 provide modularity and flexibility to the light fixture 100, thereby allowing the light fixture 100 to have various arrangements, patterns, and/or shapes as desired. As non-limiting examples, while FIG. 1 illustrates a light fixture 100 in the shape of a 2×2 grid, in other embodiments, the light fixture 100 may be linear, a 1×2 grid, a 1×3 grid, a rectangle, a "T" shape, an "L" shape, an "X" shape, a "P" shape, a "U" shape, an "H" shape, a "C" shape, an "E" shape, a "Z" shape, an "F" shape, other polygonal shapes, other letter shapes, other non-letter shapes (see, e.g., FIG. 17), combinations thereof, and/or as otherwise desired.

Referring to FIGS. 2-5, each track 102 is generally elongated and includes a pair of opposing sides 106, 108 and a cross member 110 extending therebetween. The sides 106, 108 and the cross member 110 may define an upper track area 112 and a lower track area 114. In certain embodiments, a volume of the upper track area 112 is less than a volume of the lower track area 114, although it need not be in other embodiments, and the track areas 112, 114 may have various relative sizes as desired.

Figure 14:
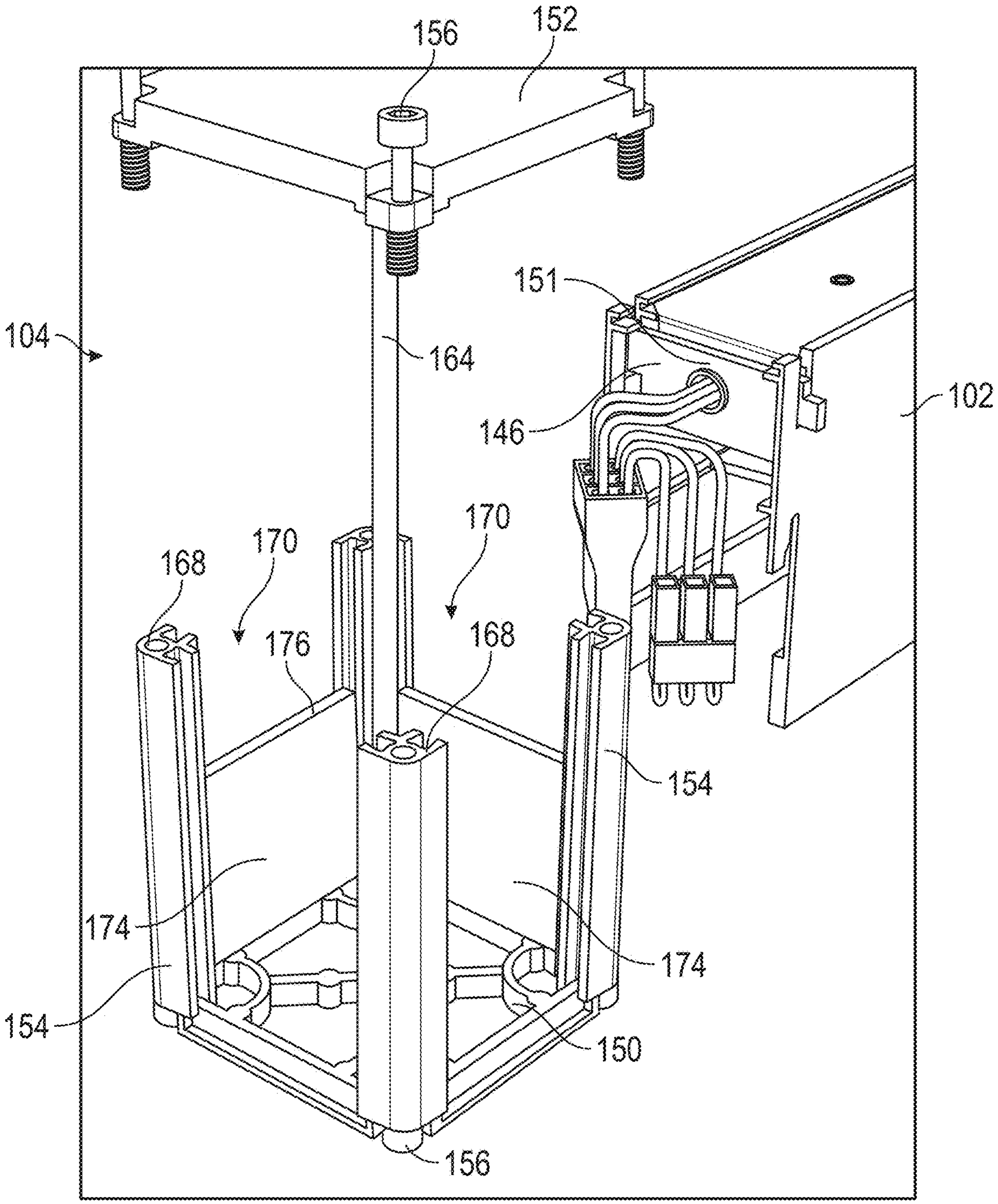
FIG. 14 illustrates one of the hubs of the light fixture of FIG. 1 and one of the tracks according to embodiments.
Figure 15:
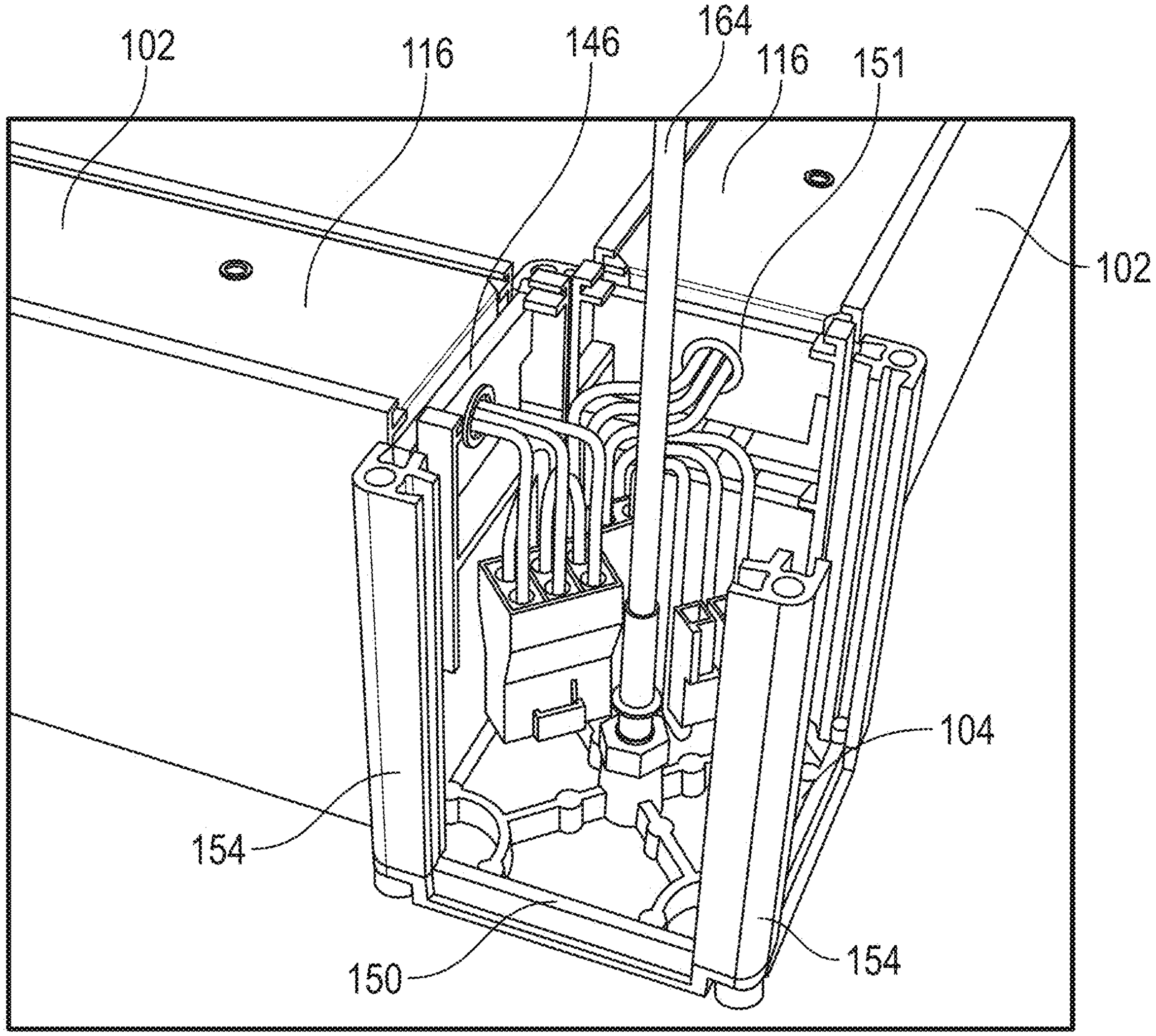
FIG. 15 illustrates one of the hubs of the light fixture of FIG. 1 assembled with two of the tracks according to embodiments.

In some embodiments, and when the particular piece of track 102 is a powered or electrified section, one or more electrical components may be received within and/or supported by the upper track area 112. As a non-limiting example, and as best illustrated in FIGS. 14 and 15, one or more drivers 116 may be at least partially received within the upper track area 112. In certain embodiments, the upper track area 112 may include all line voltage (AC) power and wiring, and may include a cover 124 to create the volume of the upper track area 112, which may be a UL-specified enclosure. In certain embodiments, the lower track area 114 may contain only wires and/or components carrying a DC voltage (e.g., of 60 volts or less) and may remain open.

Figure 5:
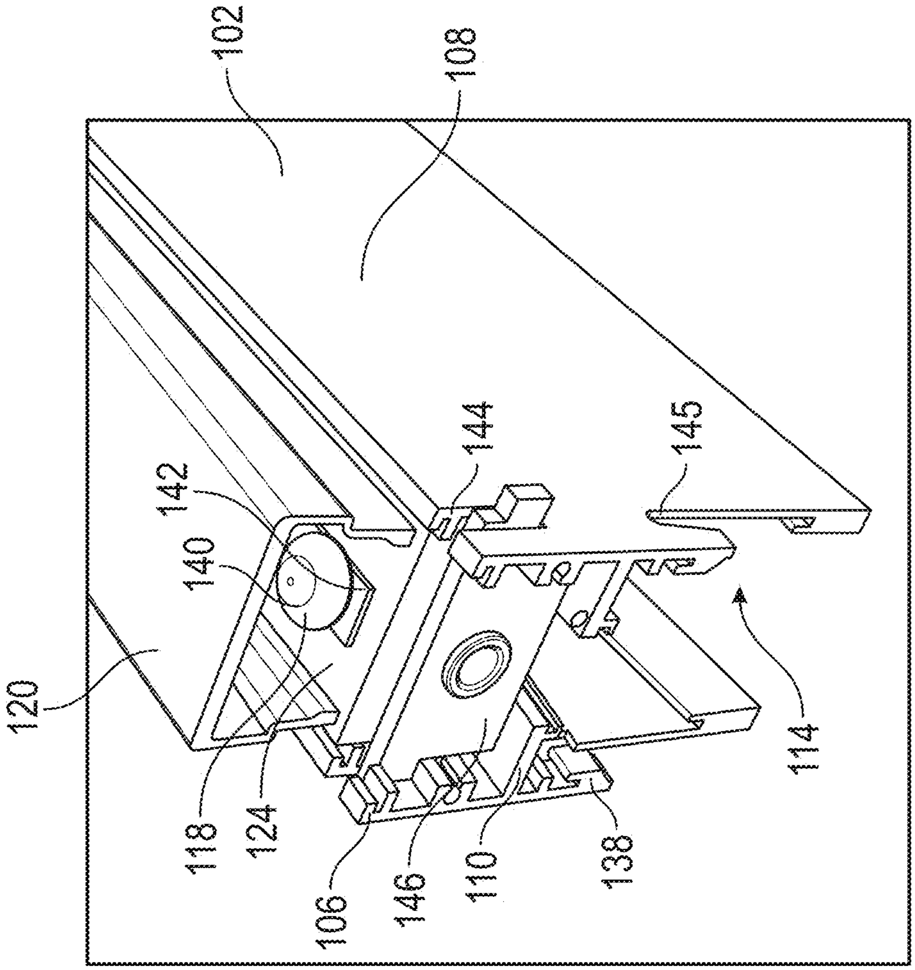
FIG. 5 illustrates one of the tracks of the light fixture of FIG. 1 with an uplight lighting source according to embodiments

Additionally, or alternatively, and as best illustrated in FIG. 5, an uplight lighting source 118 may be supported on, within, and/or relative to the upper track area 112. Various uplight lighting sources 118 may be utilized as desired, such as but not limited to a light emitting diode ("LED"), an organic LED ("OLED"), an incandescent bulb, combinations thereof, or other sources as desired. In the embodiment illustrated, the uplight lighting source 118 includes one or more LEDs 140 on one or more printed circuit boards ("PCBs") 142. In these embodiments, each of the one or more PCBs 142 may have wiring for connecting to the driver, which can be shared between PCBs, or each PCB may have its own power supply. The LEDs may be single-die or multi-die LEDs that are powered by direct current (DC) or alternating current (AC) as desired. In various embodiments, the LEDs are organic light emitting diodes. White LEDs, color LEDs, multicolor LEDs, or a combination thereof may be used.

Figure 3:
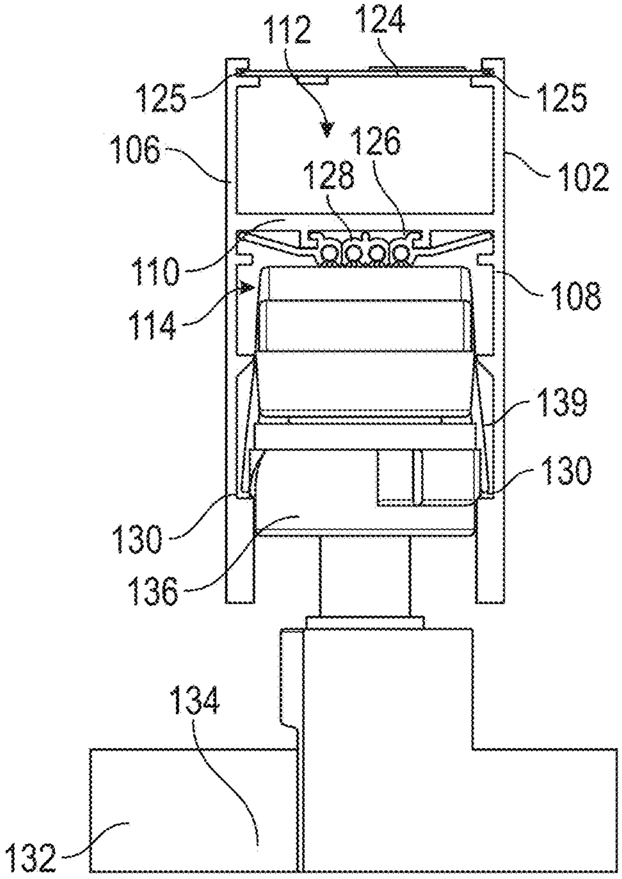
FIG. 3 is an end view of one of the tracks of the light fixture of FIG. 1 with a downlight lighting source according to embodiments.

In embodiments where the one or more electrical components includes the uplight lighting source 118, additional features such as but not limited to one or more optics 120, lenses, reflectors, diffusers, combinations thereof, etc. may be supported on, within, and/or relative to the upper track area 112. As best illustrated in FIG. 3, the cover 124 may be provided for selectively closing the upper track area 112, which may create a UL-defined "enclosure." In such embodiments, the sides 106, 108 optionally include one or more guides 125 for receiving and positioning the cover 124 relative to the sides 106, 108 and the upper track area 112. Optionally, one or more electrical components, such as but not limited to the uplight lighting sources 118, may be supported on the cover 124.

Figure 2:
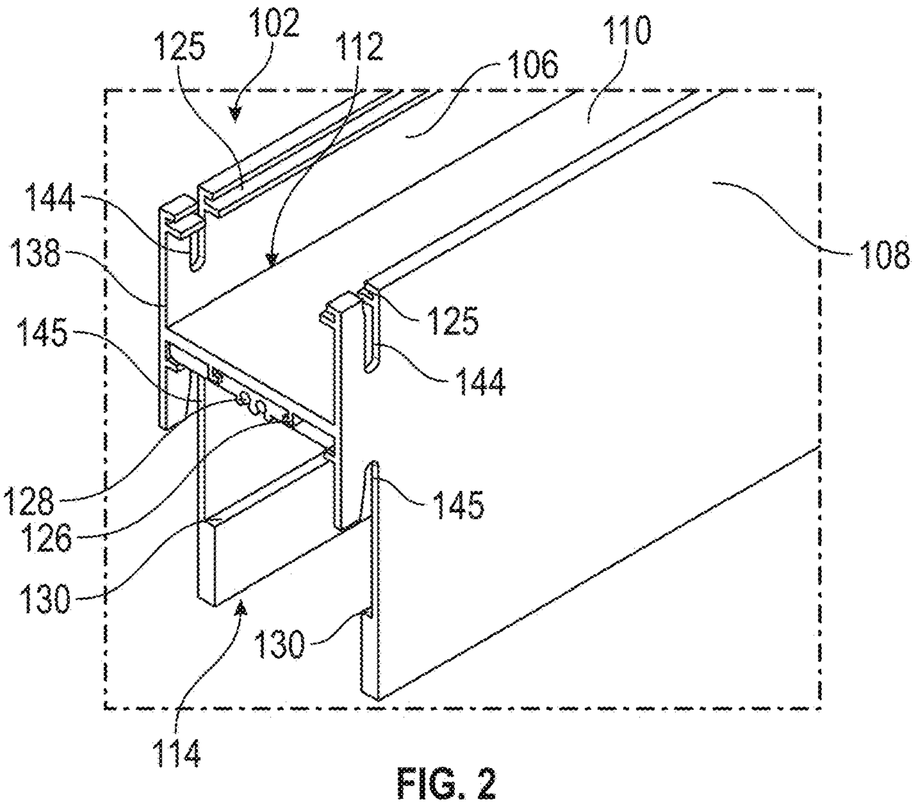
FIG. 2 is a perspective view of one of the tracks of the light fixture of FIG. 1 according to embodiments.

Referring to FIGS. 2 and 3, the lower track area 114 may include various support features for receiving and/or supporting various components on, within, and/or relative to the lower track area 114. In some non-limiting examples, and as best illustrated in FIGS. 2 and 3, the lower track area 114 may include a wiring support guide 126 for supporting wiring 128 within the lower track area 114. In some embodiments, the wiring support guide 126 may support wiring 128 along a length of the track 102 and/or any sub-portion of the length of the track 102 as desired. In certain embodiments, the wiring support guide 126 may support the wiring 128 such that an electrical component, such as but not limited to a downlight lighting source 132, may engage and electrically connect with the wiring 128 at a plurality of locations along the track 102

Figure 4:
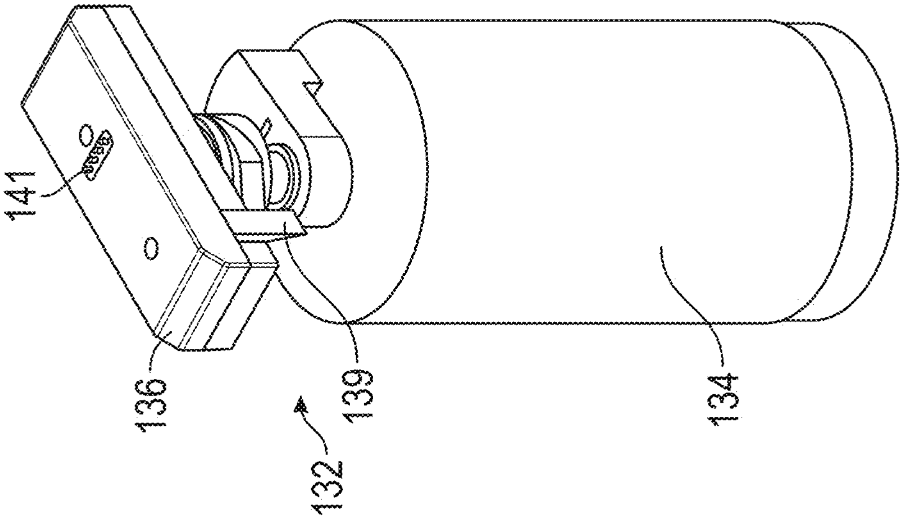
FIG. 4 illustrates the downlight lighting source of FIG. 3 according to embodiments.

Additionally, or alternatively, the lower track area 114 may include one or more support ledges 130 for selectively engaging and supporting a component within the lower track area 114. As best illustrated in FIGS. 3 and 4, in some embodiments, the downlight lighting source 132 may be supported on the ledges 130 and at least partially within the lower track area 114. While a plurality of downlight lighting sources 132 may be utilized with the track 102 as desired, in some embodiments, and as best illustrated in FIGS. 3 and 4, the downlight lighting source 132 may include a lamp 134 with a base 136. Referring to FIG. 4, in some embodiments, the base 136 may include one or more flanges 139 for selectively engaging the support ledges 130. In other embodiments, the base 136 and/or other component of the downlight lighting source 132 (and/or other electrical component) may include other features for engaging the support ledges 130. Optionally, electrical contacts 141 for engaging the wiring 128 (see FIG. 3) may be provided on the base 136. Optionally, the lamp 134 may swivel, pivot, rotate, and/or otherwise be movable relative to the base 136, although it need not be movable in other embodiments. In certain embodiments, the lamp 134 and base 136 as the downlight lighting source 132 may allow for the downlight lighting source 132 to be positioned at various locations along the track 102 and at various orientations relative to the track 102. As mentioned, in other embodiments, other downlight lighting sources 132 and/or other electrical components may be supported on, within, or relative to the lower track area 114 as desired.

Referring to FIG. 2, each end 138 includes upper notches 144 and lower notches 145. The upper notches 144 optionally may receive a portion of an upper connecting wall 146 for closing the upper track area 112 proximate to the ends 138. Upper connecting walls 146 optionally include a wiring aperture 151 (see, e.g., FIGS. 5, 12, 14, and 15), although they need not in other embodiments (see, e.g., FIG. 13). As described in detail below, the lower notches 145 may receive a lower connecting wall 174 of a hub 104 for joining the track 102 with the hub 104.

Figure 7:
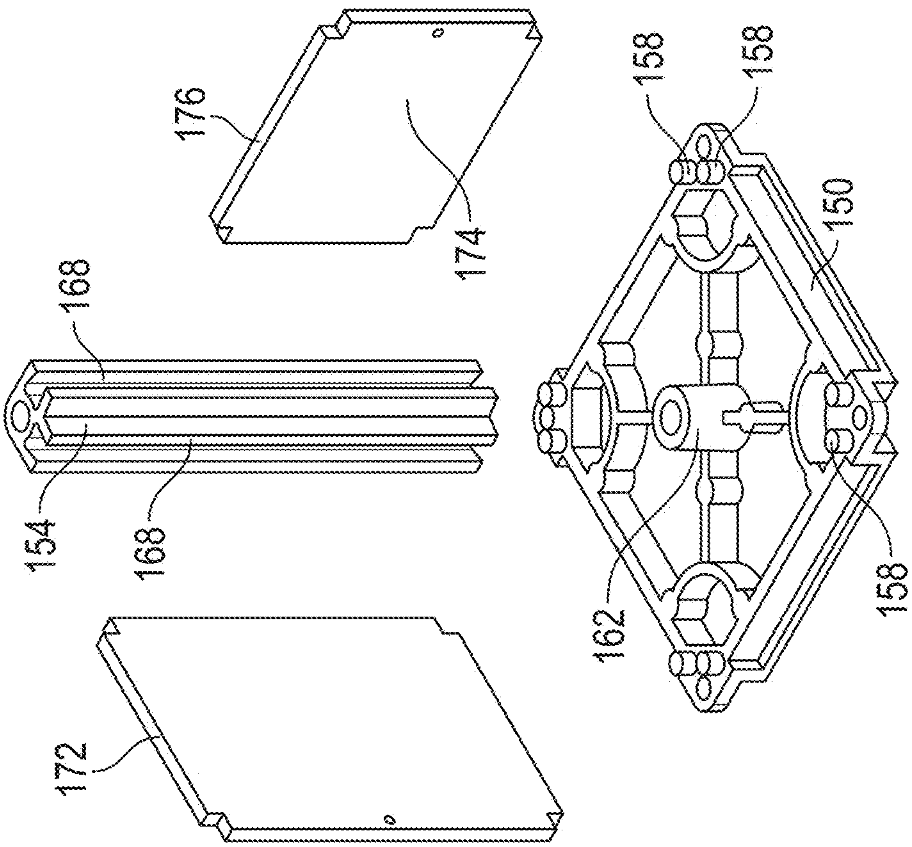
FIG. 7 illustrates various subcomponents of one of the hubs of the light fixture of FIG. 1 according to embodiments.
Figure 6:
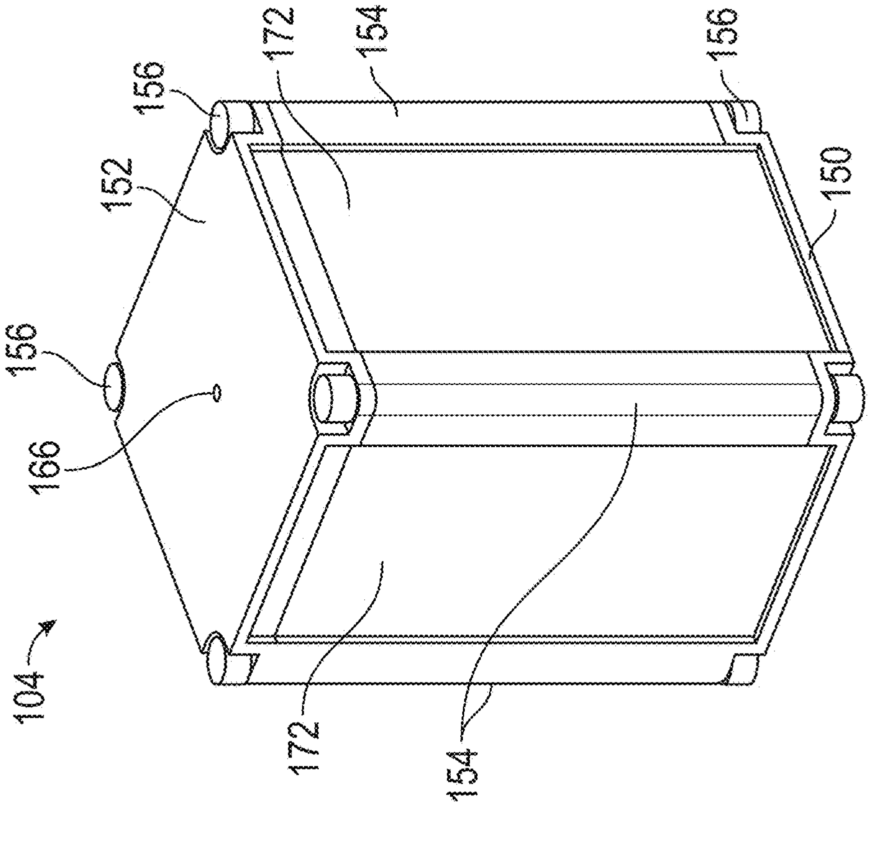
FIG. 6 is a perspective view of one of the hubs of the light fixture of FIG. 1 according to embodiments.
Figure 8:
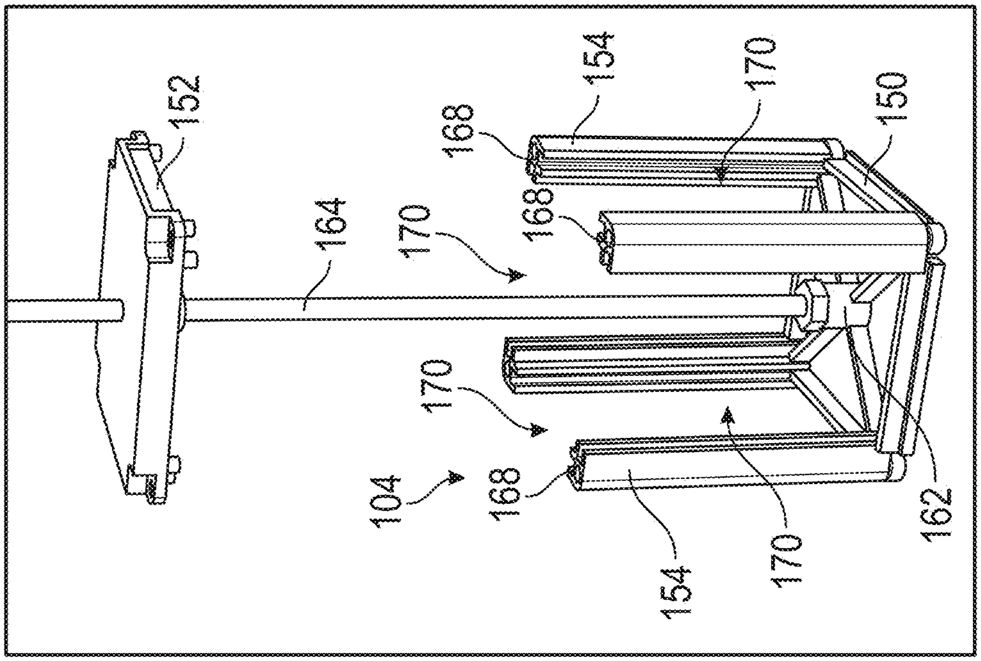
FIG. 8 illustrates one of the hubs of the light fixture of FIG. 1 partially assembled according to embodiments.

Referring to FIGS. 6-8, each hub 104 includes a base 150, a cover 152, and a plurality of corner members 154. Upper and lower fasteners 156 may secure the corner members 154 to the base 150 and the cover 152, respectively.

In certain embodiments, and as best illustrated in FIG. 7, the base 150 may include engagement features 158 for engaging channels 168 of the corner members 154. Optionally, the base 150 includes a cable hub 162 for engaging a support cable 164, which may be utilized to suspend and support the light fixture 100 within an installation environment. In certain embodiments, the cable hub 162 (and thus the support cable 164) is centered on the base 150 and centered on the hub 104.

In various embodiments, the cover 152 may be similar to the base 150 but may include a cable aperture 166 in place of the cable hub 162. In certain embodiments, and as illustrated in FIGS. 8-11, for example, the support cable 164 may be connected to the cable hub 162 of the base 150 of the hub 104 and may extend through the hub 104 and through the cable aperture 166. In some embodiments, the cable hub housing of the cover 152 may include a flexible polymeric device (or other suitable material) which may be inserted as a cable gripper, sufficient to hold cover 152 at a location on the able 164 while wiring of the assembly is being completed within the enclosure.

The base 150 and the cover 152 may have complimentary shapes and define a shape or profile of the hub 104. The hub 104 may have various shapes or profiles as desired, including but not limited to rectangular as illustrated in FIGS. 1-16, triangular (see, e.g., FIGS. 17-19), pentagonal, hexagonal, and/or other polygonal shapes or combinations of shapes as desired.

Each corner member 154 includes one or more channels 168. In various embodiments, the channels 168 extend along a height of the corner member 154, although they need not in other embodiments. Moreover, while the channels 168 are illustrated as generally straight or linear in FIG. 7, in other embodiments, they need not be straight and instead may have a radius of curvature as desired. In embodiments with a plurality of channels 168 and depending on a shape of the hub 104, various angles may be defined between channels 168 of the corner member 154.

As best illustrated in FIGS. 7 and 8, adjacent corner members 154 and the base 150 define one or more openings 170. Depending on the shape of the hub 104 and thus the number of corner members 154, the corner members 154 and base 150 may defined various openings as desired. As non-limiting examples, adjacent corner members 154 of the rectangular hub 104 in FIGS. 1-16 define four openings 170 for each hub 104, and adjacent corner members 154 of the triangular hub 104 in FIGS. 17-19 define three openings 170 for each hub 104.

In certain embodiments, the adjacent corner members 154 are arranged on the base 150 such that adjacent channels 168 of adjacent corner members 154 face each other and face the opening 170. The openings 170 may have various shapes or profiles as desired, and the shape of the openings 170 illustrated should not be considered limiting. Each opening 170 of the hub 104 may receive one or more components within the opening 170 and connect to those components within the opening 170.

In some embodiments, the component received within the opening 170 is a closing wall 172. As illustrated in FIGS. 6 and 7, for example, closing walls 172 have a height substantially filling the opening 170 such that the closing wall 172 positioned within the opening 170 fills or obstructs the opening 170. In certain embodiments, the closing wall 172 may be positioned within the opening 170 by positioning the closing wall 172 within the channels 168 of adjacent corner members 154.

In other embodiments, component received within the opening 170 is one of the tracks 102. In these embodiments, the hub 104 may additionally receive at least a lower connecting wall 174 within the opening 170. Optionally, the hub 104 may additionally receive the upper connecting wall 146 within the opening 170.

Figure 9:
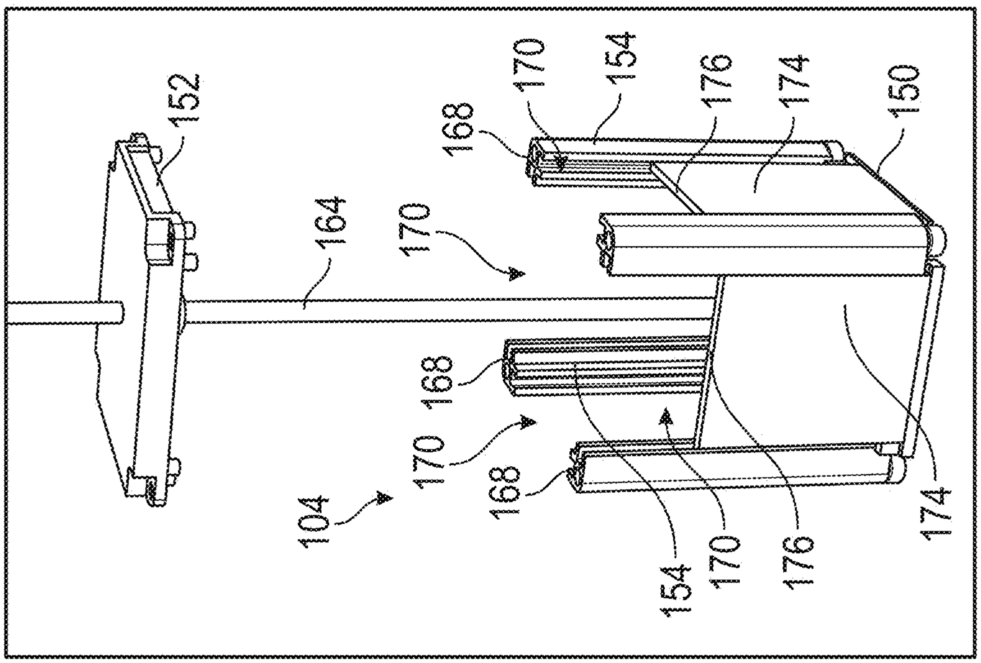
FIG. 9 illustrates one of the hubs of the light fixture of FIG. 1 partially assembled according to embodiments.
Figure 10:
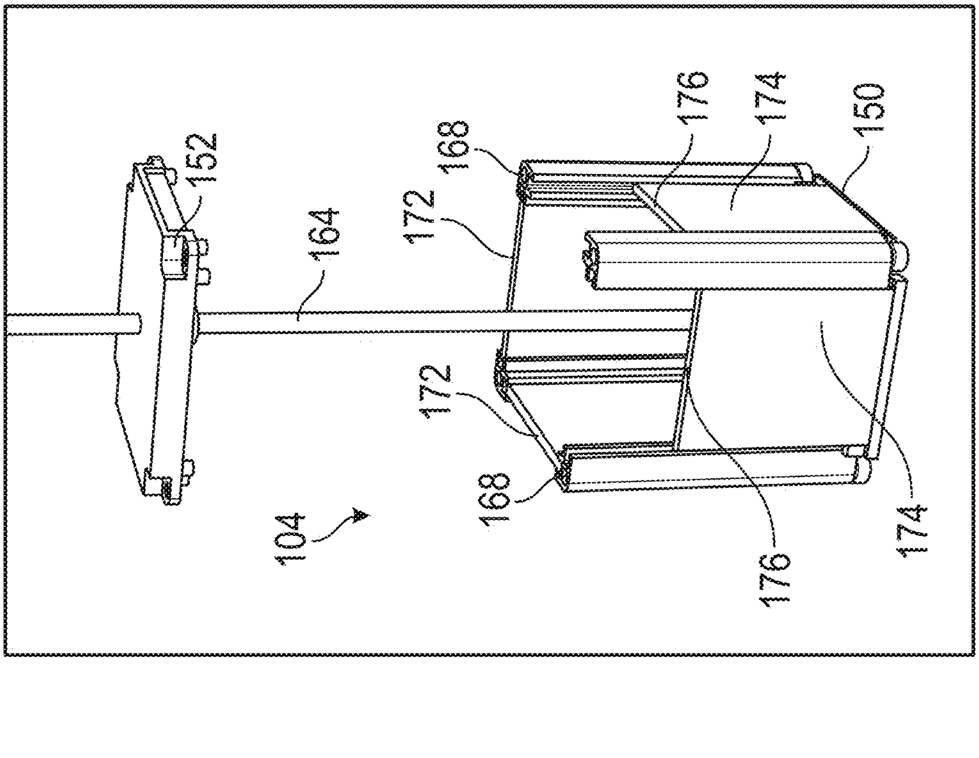
FIG. 10 illustrates one of the hubs of the light fixture of FIG. 1 partially assembled according to embodiments.

The lower connecting wall 174 may be positioned within the opening 170 by positioning the lower connecting wall 174 within the channels 168 of adjacent corner members 154. Referring to FIGS. 7, 9, and 10, the lower connecting wall 174 has a height less than the height of the closing wall 172 such that when the lower connecting wall 174 is positioned within the opening 170, the opening 170 is not completely filled by the lower connecting wall 174. In various embodiments, the track 102 is positioned within the opening 170 such that an upper edge 176 of the lower connecting wall 174 is received within the lower notches 145 of the track 102, thereby connecting the track 102 to the hub 104 and positively latching the components together. The upper connecting wall 146, in addition to being positioned within the upper notches 144 of the track 102, is positioned within the channels 168 of adjacent corner members 154 (and thus is positioned within the opening 170). In this regard, the track 102 is received within the opening 170 and connected to the hub 104 within the opening 170 (e.g., via the upper connecting wall 146 and the lower connecting wall 174).

By positioning a closing wall 172 or a track 102 within a particular opening 170 of the hub 104, the shape of the light fixture 100 may be extended (via the track 102) or terminated (via the closing wall 172) in a particular direction as desired. As such, the modular nature of the hub 104 and track 102 may provide installation flexibility and an ability to shape a light fixture as desired.

Figure 18:
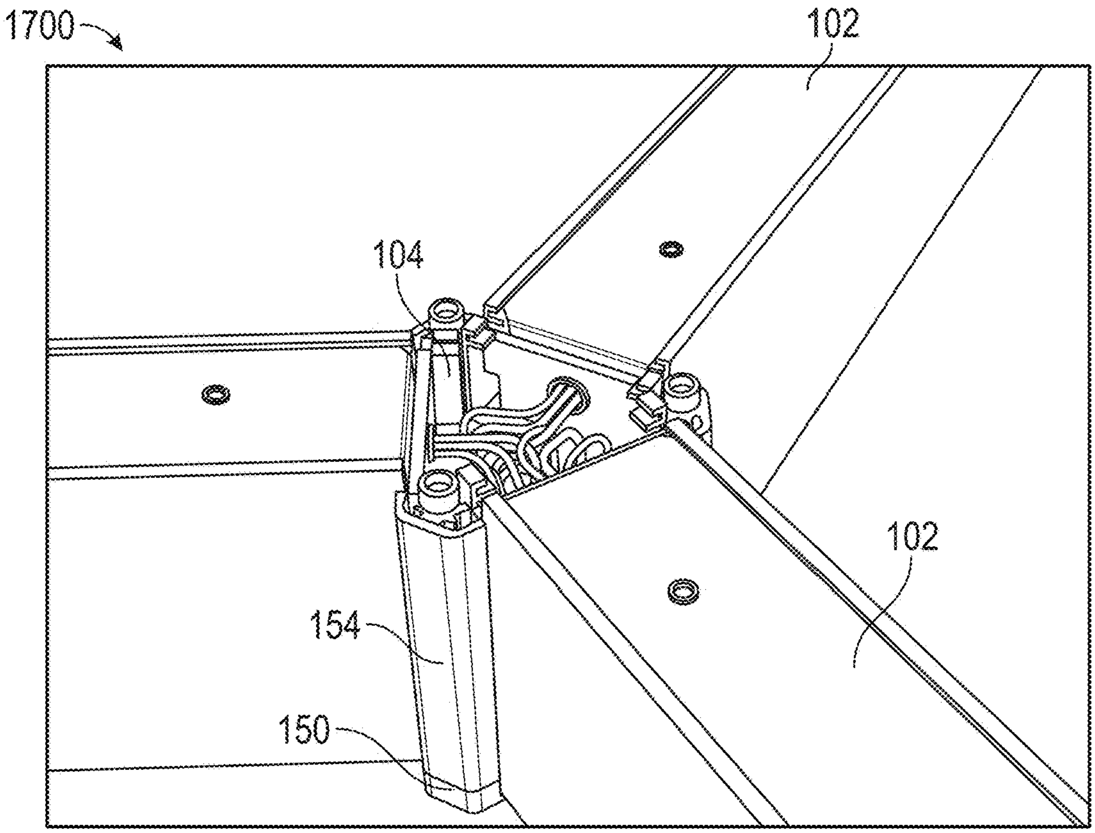
FIG. 18 illustrates a portion of the light fixture of FIG. 17.

As illustrated in FIGS. 15 and 18, in embodiments where a plurality of powered or electrified tracks 102 are connected to a common hub 104 and/or where external power and/or electrical wiring is provided to the hub 104, the hub 104 may form a junction box.

Figure 16:
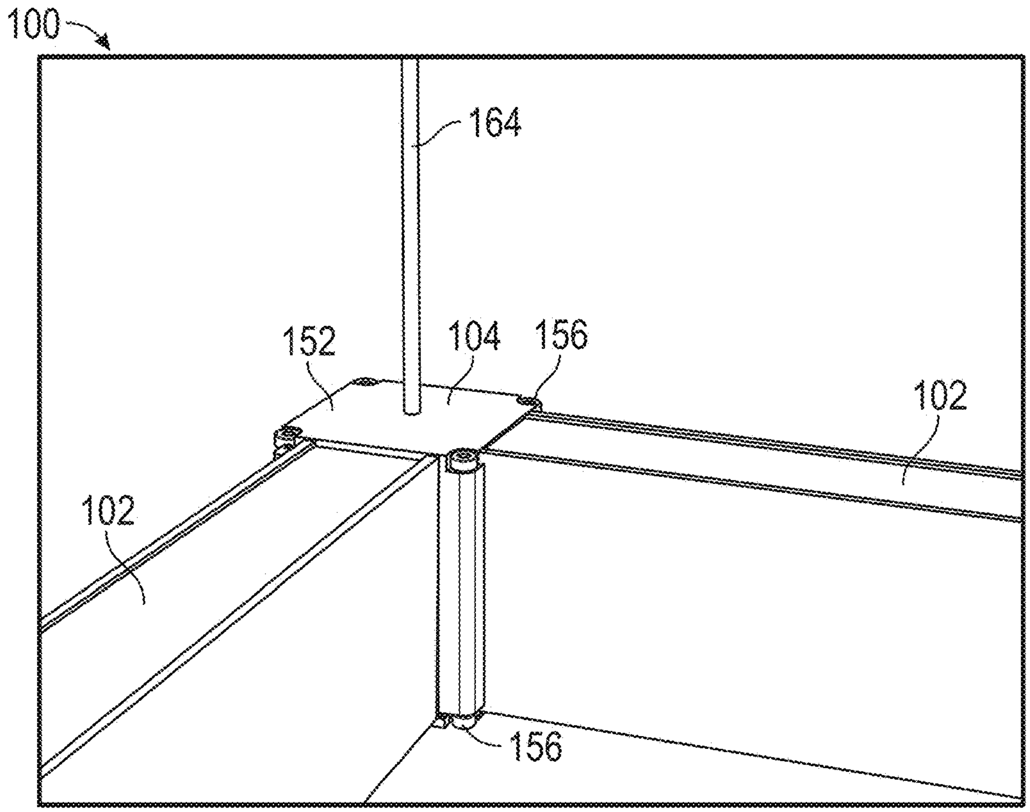
FIG. 16 illustrates one of the hubs of the light fixture of FIG. 1 assembled with two of the tracks according to embodiments.
Figure 17:
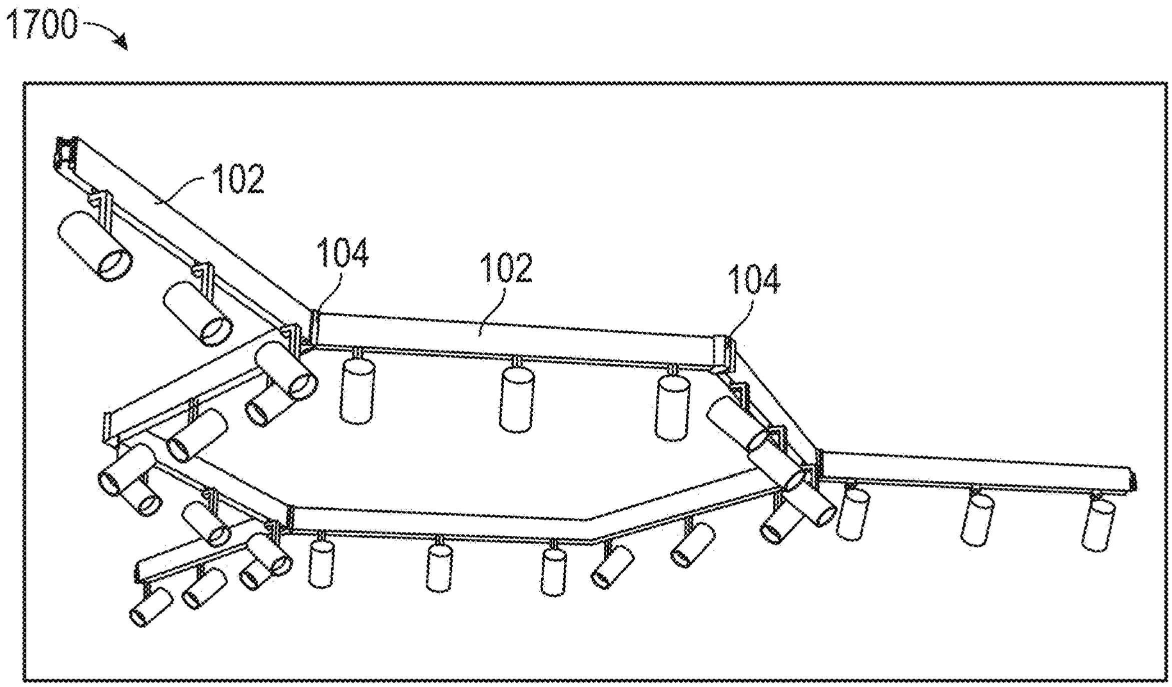
FIG. 17 illustrates a light fixture with one or more hubs and one or more tracks according to embodiments.
Figure 19:
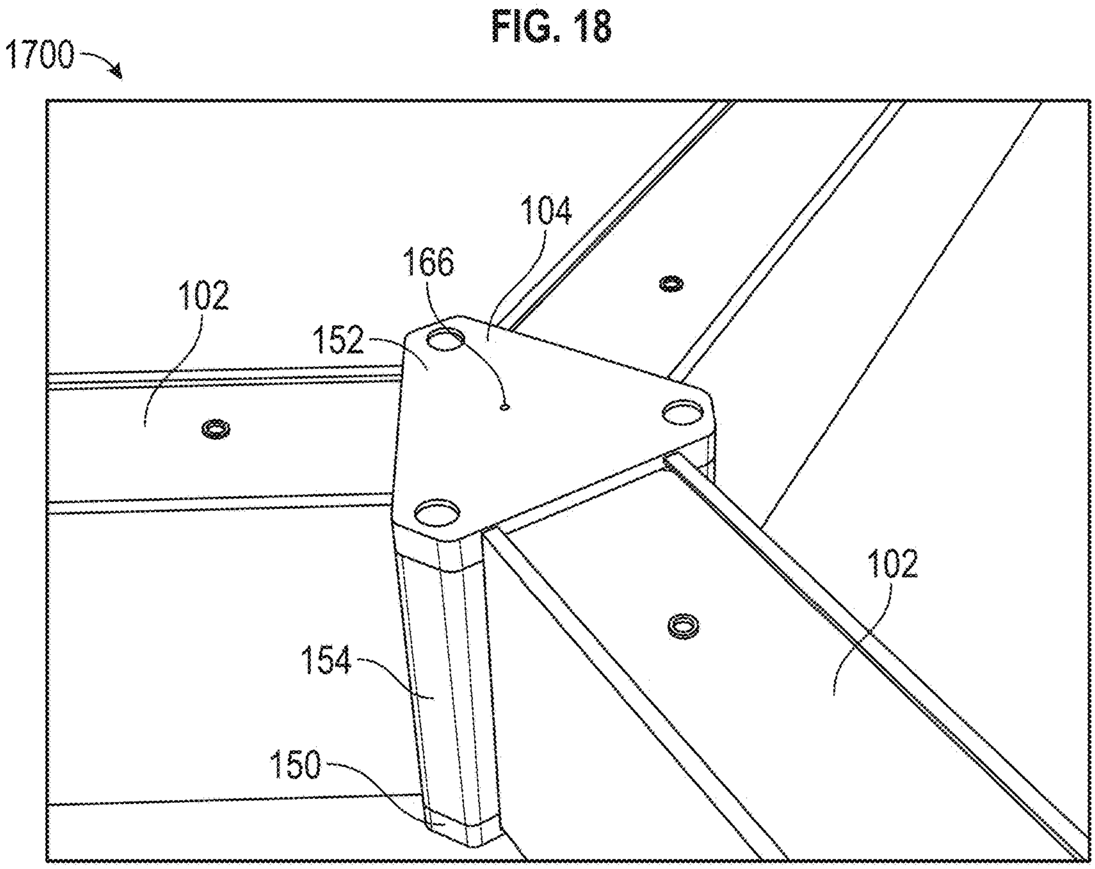
FIG. 19 illustrates a portion of the light fixture of FIG. 17.

FIGS. 17-19 illustrate a light fixture 1700 that is similar to the light fixture 100 of FIGS. 1-16 except that the light fixture 1700 has a different shape and at least one hub 104 of the light fixture 1700 has a triangular profile. As previously described, in other embodiments, hubs 104 of a light fixture may be different shapes or combinations of shapes as desired, and the particular shapes illustrated should not be considered limiting.

A method of assembling a light fixture is described in detail below and with reference to FIGS. 8-16. While the method is described in the context of light fixture 100, the method may be utilized to assemble light fixtures of other shapes or profiles as desired.

Referring to FIG. 8, in various embodiments, the method includes assembling corner members 154 with the base 150 such that the hub 104 defines one or more openings 170. Optionally, assembly of the hub 104 may be performed while the support cable 164 (and thus the base 150 and cover 152) are already suspended within an installation environment. In other embodiments, the base 150 and cover 152 need not be previously suspended, and the hub 104 and/or the light fixture 100 may be suspended within an installation environment at any stage of installation as desired. In certain embodiments, assembling the corner members 154 with the base 150 includes utilizing one or more fasteners 156.

Referring to FIGS. 9 and 10, the method includes installing one or more lower connecting walls 174 within a corresponding opening 170 (FIG. 9). Optionally, and depending on a desired shape or configuration of the light fixture 100, the method includes installing one or more closing walls 172 within a corresponding opening 170 (FIG.

10). The number and location of the openings 170 with lower connecting walls 174 and closing walls 172 should not be considered limiting on the disclosure. Positioning the lower connecting wall 174 and/or the closing wall 172 within a particular opening 170 may include positioning the lower connecting wall 174 or the closing wall 172 within the channels 168 of adjacent corner members 154 defining the opening 170.

Figure 11:
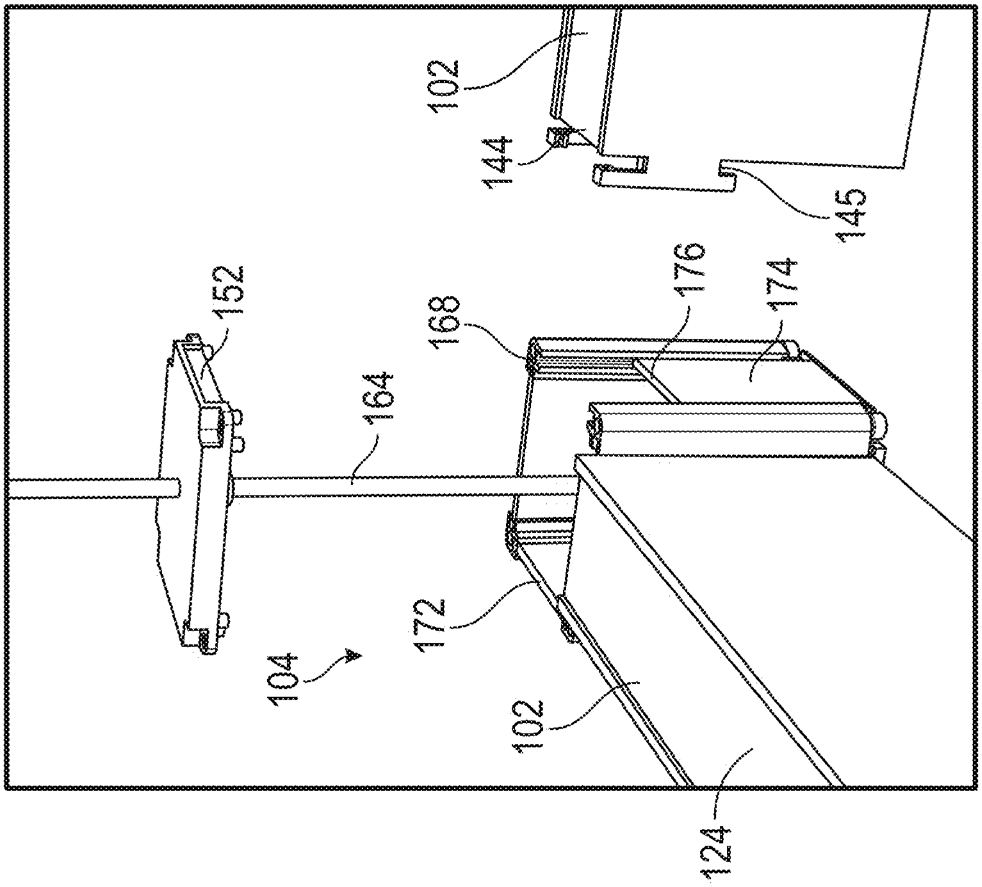
FIG. 11 illustrates one of the hubs of the light fixture of FIG. 1 assembled with one of the tracks according to embodiments.

In various embodiments, and referring to FIG. 11, the method includes installing tracks 102 within the openings 170 with the lower connecting walls 174. In the embodiment illustrated, the hub 104 includes two openings 170 with lower connecting walls 174 and thus the method includes assembling two tracks 102 with the hub 104. In various embodiments, installing the tracks 102 within the openings 170 includes positioning the tracks 102 within the corresponding openings 170 and such that the upper edges 176 of the lower connecting walls 174 are received within the lower notches 145 of the tracks 102.

Figure 12:
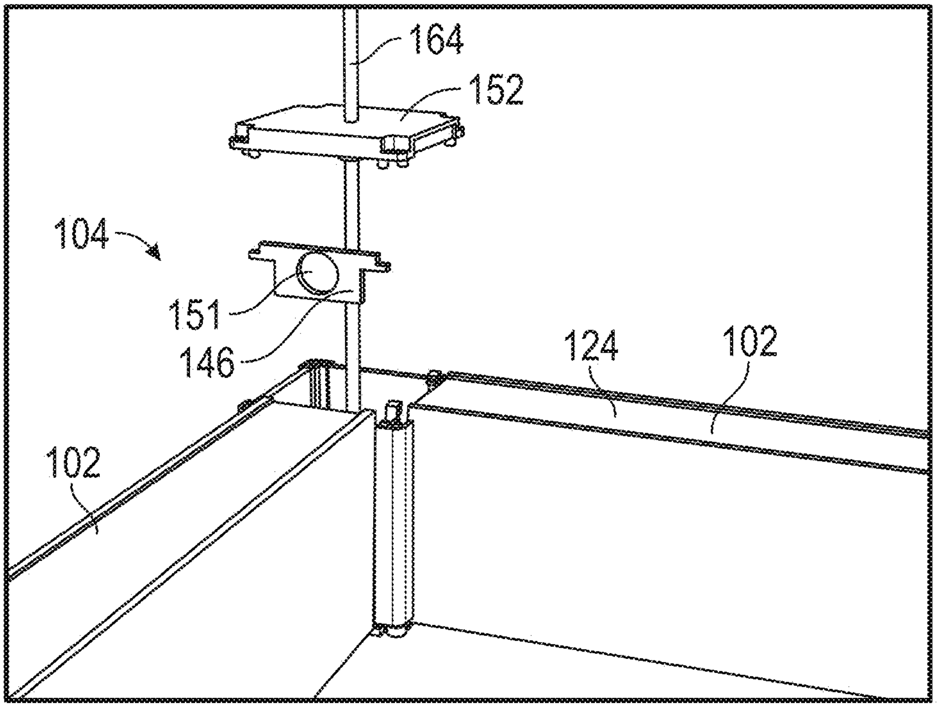
FIG. 12 illustrates one of the hubs of the light fixture of FIG. 1 assembled with two of the tracks according to embodiments.
Figure 13:
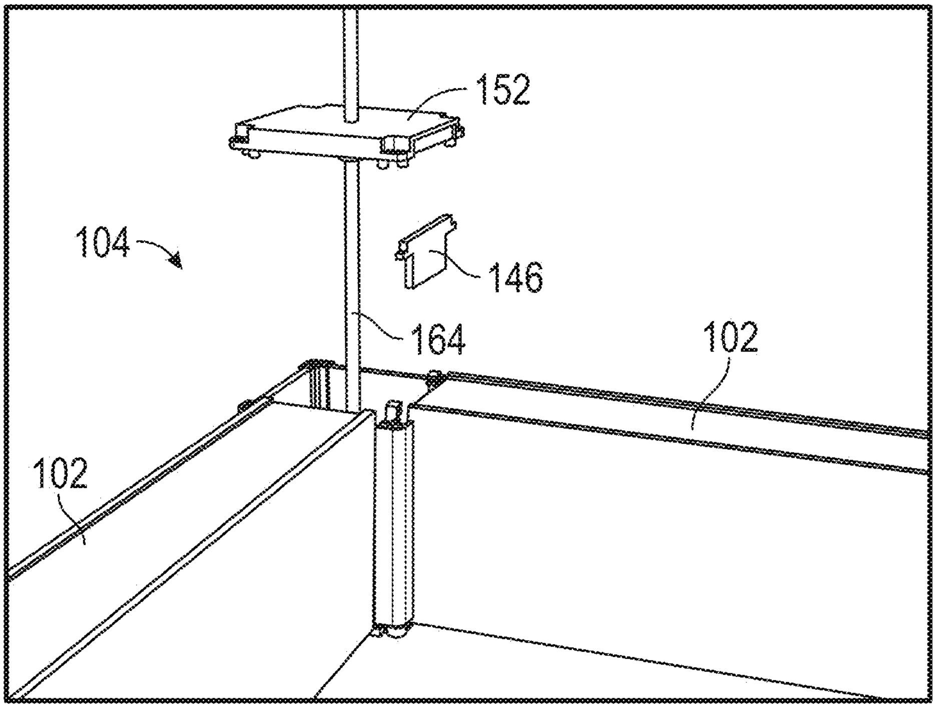
FIG. 13 illustrates one of the hubs of the light fixture of FIG. 1 assembled with two of the tracks according to embodiments.

Referring to FIGS. 12 and 13, the method optionally includes installing upper connecting walls 146 within the openings 170 with the tracks 102. In certain embodiments, positioning the upper connecting walls 146 within the openings 170 includes positioning the upper connecting walls within the upper notches 144 of the tracks 102 and within the channels 168 of adjacent corner members 154 defining the opening 170. In embodiments where a track 102 is powered and/or includes through electrical wiring (see, e.g., FIGS. 12, 14, and 15), the upper connecting wall 146 may include the wiring aperture 151. In embodiments where a track 102 is unpowered or does not include through electrical connections (see, e.g., FIG. 13), the upper connecting wall 146 need not include the wiring aperture 151.

Referring to FIG. 16, the method may include engaging the cover 152 of the hub 104 with the corner members 154 and using the fasteners 156 to secure the corner members 154 to the base 150 and the cover 152, respectively. In certain embodiments, assembling the cover 152 with the corner members 154 and securing the cover 152 and the base 150 to the corner members 154 using the fasteners 156 may "sandwich" those components positioned within the opening 170 such that they remain latched or connected to the hub 104. Such assembly may provide improved engagement between components forming the light fixture 100, may minimize the use of mechanical fasteners in the overall light fixture 100, and may allow for connection between a track 102 and a hub 104 without using mechanical fasteners while allowing the assembly of the light fixture 100 in a plurality of arrangements, patterns, and/or shapes as desired.

The aforementioned examples are for illustrative purposes, and light fixtures according to the disclosure may have various combinations of hubs and/or tracks as desired and to form light fixtures with various shapes or profiles as desired.

A collection of exemplary embodiments is provided below, including at least some explicitly enumerated as "Embodiments" providing additional description of a variety of example embodiments in accordance with the concepts described herein. These embodiments are not meant to be mutually exclusive, exhaustive, or restrictive; and the disclosure not limited to these example embodiments but rather encompasses all possible modifications and variations within the scope of the issued claims and their equivalents.

Embodiment 1. A light fixture comprising at least one hub comprising at least one opening and at least one track configured to connect within the at least one opening to join the at least one track with the at least one hub.

Embodiment 2. The light fixture of any of the preceding or subsequent embodiments or combination of embodiments, wherein the at least one track is configured to support at least one light source.

Embodiment 3. The light fixture of any of the preceding or subsequent embodiments or combination of embodiments, wherein the at least one opening is defined by and between a pair of corner members.

Embodiment 4. The light fixture of any of the preceding or subsequent embodiments or combination of embodiments, wherein each corner member of the pair of corner members comprises a channel (i) facing the opening and (ii) extending along a height of the corner member.

Embodiment 5. The light fixture of any of the preceding or subsequent embodiments or combination of embodiments, wherein the at least one hub comprises a base, a cover, and a plurality of corner members extending between the base and the cover, wherein adjacent corner members of the plurality of corner members define the at least one opening.

Embodiment 6. The light fixture of any of the preceding or subsequent embodiments or combination of embodiments, wherein the at least one opening comprises a plurality of openings.

Embodiment 7. The light fixture of any of the preceding or subsequent embodiments or combination of embodiments, wherein the at least one track comprises an upper track area and a lower track area physically separated from the upper track area.

Embodiment 8. The light fixture of any of the preceding or subsequent embodiments or combination of embodiments, wherein the at least one hub further comprises a connecting wall within the at least one opening, and wherein an end of the at least one track comprises at least one notch configured to receive a portion of the connecting wall within the at least one opening.

Embodiment 9. The light fixture of any of the preceding or subsequent embodiments or combination of embodiments, wherein the at least one opening comprises at least two openings, and wherein the at least one track comprises a first track and a second track, wherein the first track is received within a first opening of the at least two openings, the second track is received within a second opening of the at least two openings, and at least one hub forms a junction box.

Embodiment 10. A light fixture comprising at least one hub, the at least one hub comprise at least one opening configured to receive and releasably connect a track or a closing wall within the at least one opening.

Embodiment 11. The light fixture of any of the preceding or subsequent embodiments or combination of embodiments, wherein the at least one opening is rectangular.

Embodiment 12. The light fixture of any of the preceding or subsequent embodiments or combination of embodiments, further comprising the track, wherein the at least one hub further comprises a connecting wall, wherein the connecting wall is received within the at least one opening, and wherein the track is received within the at least one opening and is engaged with the connecting wall within the at least one opening.

Embodiment 13. The light fixture of any of the preceding or subsequent embodiments or combination of embodiments, wherein the connecting wall is a lower connecting wall, wherein the at least one hub further comprises an upper connecting wall, wherein the upper connecting wall is received within the at least one opening and is engaged with the track within the at least one opening above the lower connecting wall.

Embodiment 14. The light fixture of any of the preceding or subsequent embodiments or combination of embodiments, wherein the upper connecting wall comprises at least one wiring aperture.

Embodiment 15. The light fixture of any of the preceding or subsequent embodiments or combination of embodiments, wherein the at least one hub comprises a base, a cover, and a plurality of corner members extending between the base and the cover, wherein adjacent corner members of the plurality of corner members define the at least one opening.

Embodiment 16. The light fixture of any of the preceding or subsequent embodiments or combination of embodiments, wherein the at least one hub further comprises a support cable (i) connected to the base and (ii) extending through the cover.

Embodiment 17. The light fixture of any of the preceding or subsequent embodiments or combination of embodiments, further comprising the track, wherein the track comprises an upper track area and a lower track area physically separated from the upper track area, wherein the upper track area is configured to support at least one of a driver or an uplight lighting source, and wherein the lower track area is configured to support a downlight lighting source.

Embodiment 18. The light fixture of any of the preceding or subsequent embodiments or combination of embodiments, wherein the at least one hub comprises a plurality of hubs, each comprising at least one opening, wherein the track is a first track of a plurality of tracks, and wherein the closing wall is a first closing wall of a plurality of closing walls.

Embodiment 19. The light fixture of any of the preceding or subsequent embodiments or combination of embodiments, wherein a sectional profile of the at least one hub is a polygonal shape.

Embodiment 20. A method of supporting a light fixture, the method comprising: assembling a light fixture comprising at least one hub comprising at least one opening and a support cable and at least one track configured to connect within the at least one opening to join the at least one track with the at least one hub; and supporting the light fixture using the support cable.

The various aspects, embodiments, implementations or features of the described embodiments can be used separately or in any combination. In particular, it should be appreciated that the various elements of concepts from the figures may be combined without departing from the spirit or scope of the invention.

Throughout this description for the purposes of explanation, numerous specific details are set forth to provide a thorough understanding of the many aspects and embodiments disclosed herein. It will be apparent, however, to one skilled in the art that the many aspects and embodiments may be practiced without some of these specific details. In other instances, known structures and devices are shown in diagram or schematic form to avoid obscuring the underlying principles of the described aspects and embodiments.

The use of the terms "a" and "an" and "the" and similar referents in the context of describing the invention (especially in the context of the following claims) are to be construed to cover both the singular and the plural, unless otherwise indicated herein or clearly contradicted by context. Directional references such as "up," "down," "top," "bottom," "left," "right," "front," and "back," among others, are intended to refer to the orientation as illustrated and described in the figure (or figures) to which the components and directions are referencing. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, or gradients thereof, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, the nearness of completion will be so as to have the same overall result as if absolute and total completion were obtained. As used herein, the term "about" refers to +/−5% of an indicated value or endpoints of an indicated range.

Preferred embodiments of this invention are described herein, including the best mode known to the inventors for carrying out the invention. The invention is susceptible to various modifications and alternative constructions, and certain shown exemplary embodiments thereof are shown in the drawings and have been described above in detail. Variations of those preferred embodiments, within the spirit of the present invention, may become apparent to those of ordinary skill in the art upon reading the foregoing description. The inventors expect skilled artisans to employ such variations as appropriate, and the inventors intend for the invention to be practiced otherwise than as specifically described herein. Accordingly, it should be understood that there is no intention to limit the invention to the specific form or forms disclosed, but on the contrary, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A light fixture comprising:
at least one hub comprising at least one opening; and
at least one track configured to connect within the at least one opening to join the at least one track with the at least one hub,
wherein the at least one hub further comprises a connecting wall within the at least one opening, and wherein an end of the at least one track comprises at least one notch configured to receive a portion of the connecting wall within the at least one opening.

2. The light fixture of claim 1, wherein the at least one track is configured to support at least one light source.

3. The light fixture of claim 1, wherein the at least one opening is defined by and between a pair of corner members.

4. A light fixture comprising:
at least one hub comprising at least one opening; and
at least one track configured to connect within the at least one opening to join the at least one track with the at least one hub,
wherein the at least one opening is defined by and between a pair of corner members,
wherein each corner member of the pair of corner members comprises a channel (i) facing the opening and (ii) extending along a height of the corner member.

5. The light fixture of claim 1, wherein the at least one hub comprises a base, a cover, and a plurality of corner members extending between the base and the cover, wherein adjacent corner members of the plurality of corner members define the at least one opening.

6. The light fixture of claim 1, wherein the at least one opening comprises a plurality of openings.

7. The light fixture of claim 1, wherein the at least one track comprises an upper track area and a lower track area physically separated from the upper track area.

8. The light fixture of claim 1, wherein the at least one opening comprises at least two openings, and wherein the at least one track comprises a first track and a second track, wherein the first track is received within a first opening of the at least two openings, the second track is received within a second opening of the at least two openings, and the at least one hub forms a junction box.

9. A hub for a light fixture, the hub comprising at least one opening configured to receive and releasably connect a track or a closing wall within the at least one opening, wherein the at least one opening is defined by and between a pair of corner members, and wherein each corner member of the pair of corner members comprises a channel (i) facing the opening and (ii) extending along a height of the corner member.

10. The hub of claim 9, wherein the at least one opening is rectangular.

11. A light fixture comprising at least one hub and a track, the at least one hub comprising at least one opening configured to receive and releasably connect the track or a closing wall within the at least one opening,
wherein the at least one hub further comprises a connecting wall, wherein the connecting wall is received within the at least one opening, and wherein the track is received within the at least one opening and is engaged with the connecting wall within the at least one opening,
wherein the connecting wall is a lower connecting wall, wherein the at least one hub further comprises an upper connecting wall, wherein the upper connecting wall is received within the at least one opening and is engaged with the track within the at least one opening above the lower connecting wall.

12. The light fixture of claim 11, wherein the upper connecting wall comprises at least one wiring aperture.

13. The light fixture of claim 11, wherein the at least one hub comprises a base, a cover, and a plurality of corner members extending between the base and the cover, wherein adjacent corner members of the plurality of corner members define the at least one opening.

14. A light fixture comprising at least one hub, the at least one hub comprise at least one opening configured to receive and releasably connect a track or a closing wall within the at least one opening, wherein the at least one hub comprises a base, a cover, and a plurality of corner members extending between the base and the cover, wherein adjacent corner members of the plurality of corner members define the at least one opening, and wherein the at least one hub further comprises a support cable (i) connected to the base and (ii) extending through the cover.

15. The light fixture of claim 11, wherein the track comprises an upper track area and a lower track area physically separated from the upper track area, wherein the upper track area is configured to support at least one of a driver or an uplight lighting source, and wherein the lower track area is configured to support a downlight lighting source.

16. The light fixture of claim 11, wherein the at least one hub comprises a plurality of hubs, each comprising at least one opening, wherein the track is a first track of a plurality of tracks.

17. The light fixture of claim 11, wherein a sectional profile of the at least one hub is a polygonal shape.

18. A method of assembling a light fixture, the method comprising:
connecting at least one hub with at least one track, wherein:
the at least one hub comprises at least one opening and a connecting wall within the at least one opening;
an end of the at least one track comprises at least one notch configured to receive a portion of the connecting wall within the at least one opening; and
connecting the at least one hub with the at least one track comprises coupling the at least one notch with the connecting wall.

19. The method of claim 18, wherein:
the hub comprises a pair of corner members;
the opening is defined by and between the pair of corner members; and
each corner member of the pair of corner members comprises a channel facing the opening and extending along a height of the corner members.

20. A kit for assembling a light fixture, the kit comprising:
at least one track; and
at least one hub comprising at least one opening configured to receive and releasably connect with the at least one track or a closing wall within the at least one opening,
wherein the at least one opening is defined by and between a pair of corner members, and
wherein each corner member of the pair of corner members comprises a channel (i) facing the opening and (ii) extending along a height of the corner member.

* * * * *